United States Patent [19]

Malueg

[11] Patent Number: 4,498,038
[45] Date of Patent: Feb. 5, 1985

[54] STABILIZATION SYSTEM FOR SOFT-MOUNTED PLATFORM

[76] Inventor: Richard M. Malueg, 1301 Hidden Springs La., Glendora, Calif. 91740

[21] Appl. No.: 466,377

[22] Filed: Feb. 15, 1983

[51] Int. Cl.³ .............................................. B64C 17/02
[52] U.S. Cl. ................................... 318/648; 318/653; 354/74; 248/550
[58] Field of Search ....................... 318/648, 649, 653; 354/74; 74/5.2; 248/550

[56] References Cited

U.S. PATENT DOCUMENTS 3,775,656 11/1973 Romans ................................ 318/649
4,033,541 7/1977 Malueg .................................. 354/74
4,052,654 10/1977 Kramer et al. ...................... 318/649
4,223,259 9/1980 Ernsberger et al. ............. 318/649 X Primary Examiner—B. Dobeck
Attorney, Agent, or Firm—Christie, Parker & Hale

[57] ABSTRACT

A stabilizing system for isolating a load device from vibrations of a supporting structure includes a pivotal member and a spring isolator connecting the load device to the supporting structure. Servo controlled actuators are connected across the pivotal member to rotate and torque the load relative to the isolator to compensate for angular displacement of the supporting structure and isolator relative to the load device. An inertial sensor secured to the load device provides a reference for the servo control.

13 Claims, 5 Drawing Figures

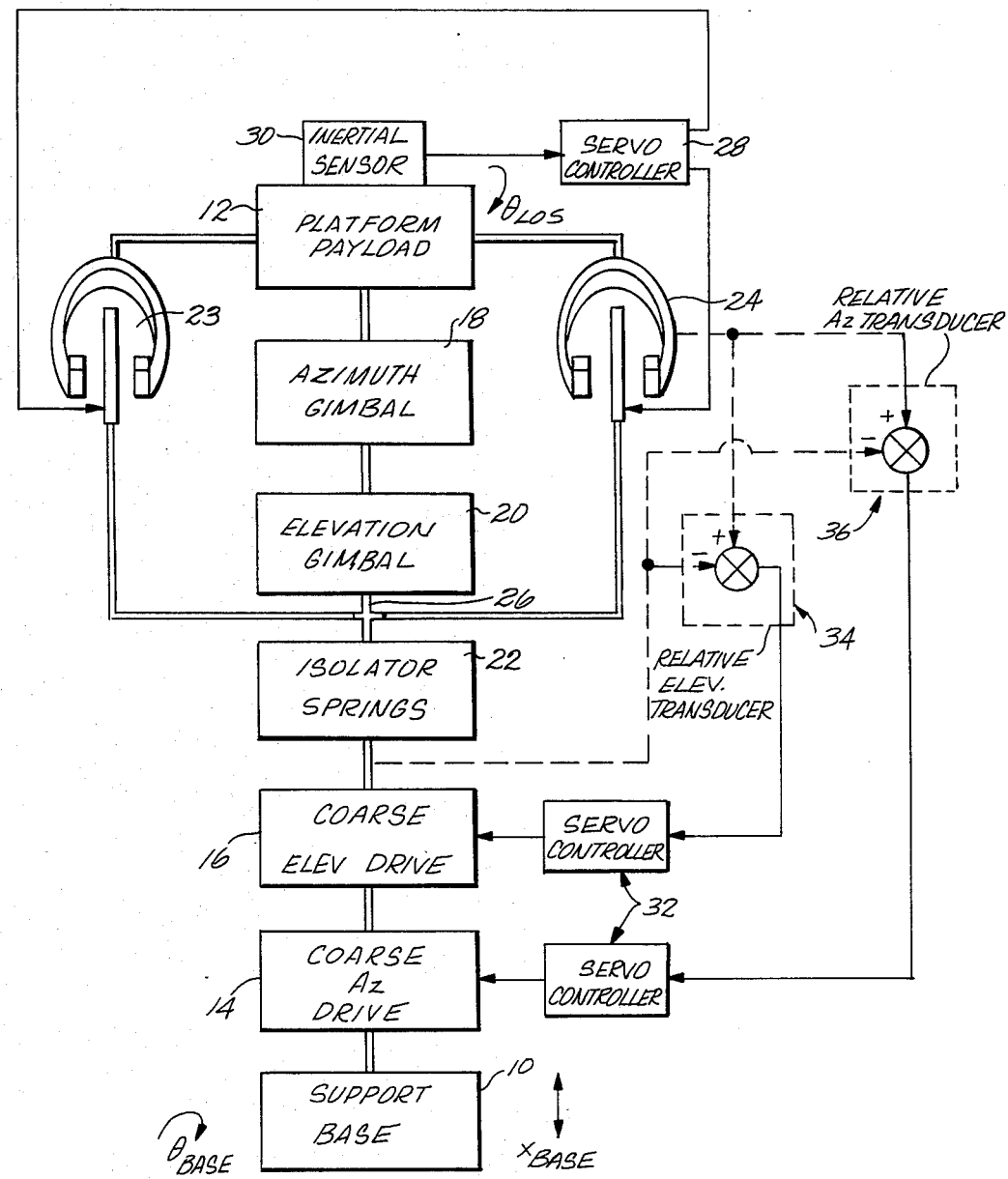

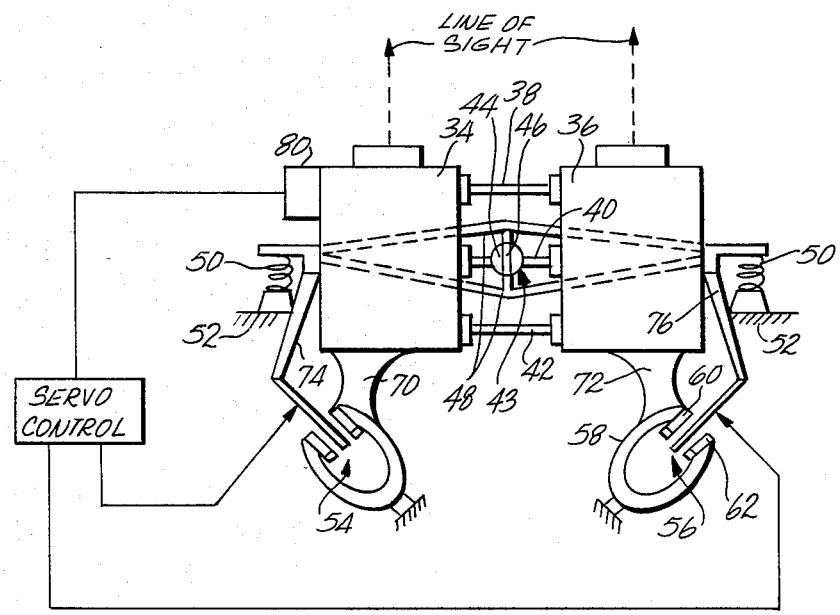

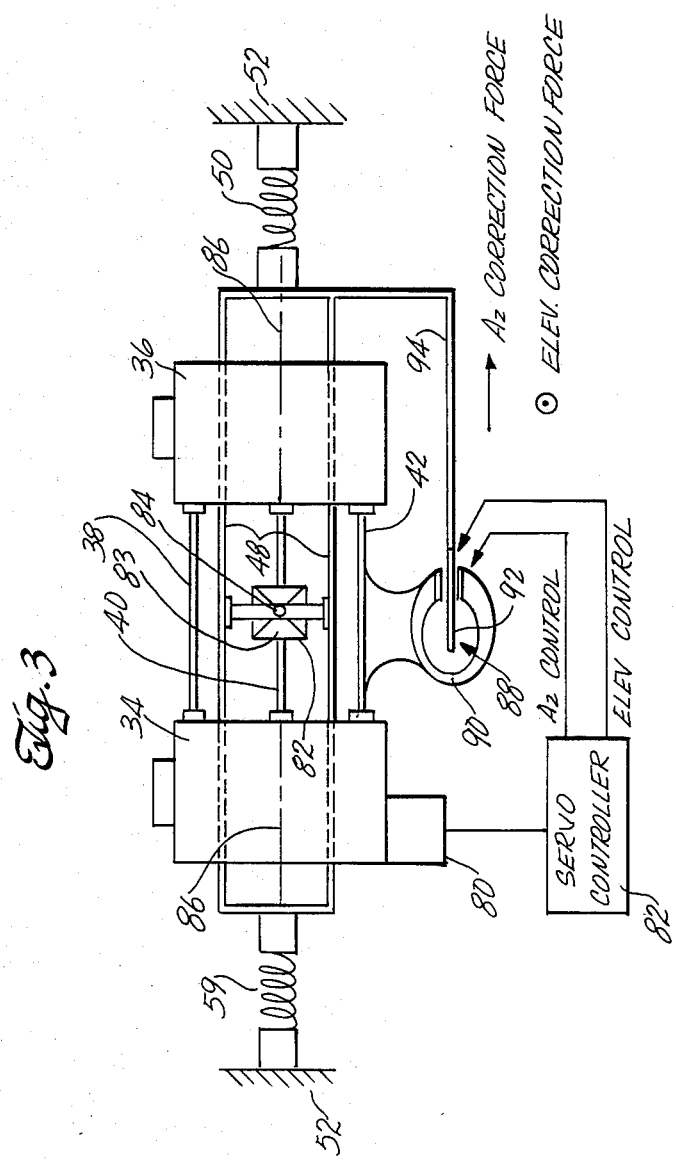

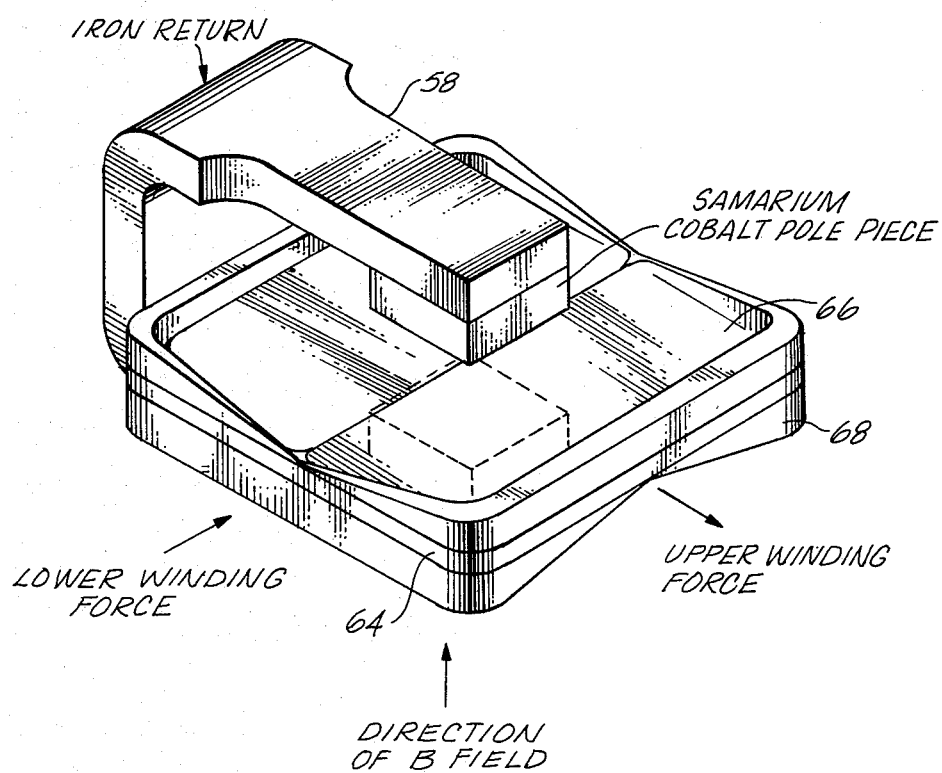

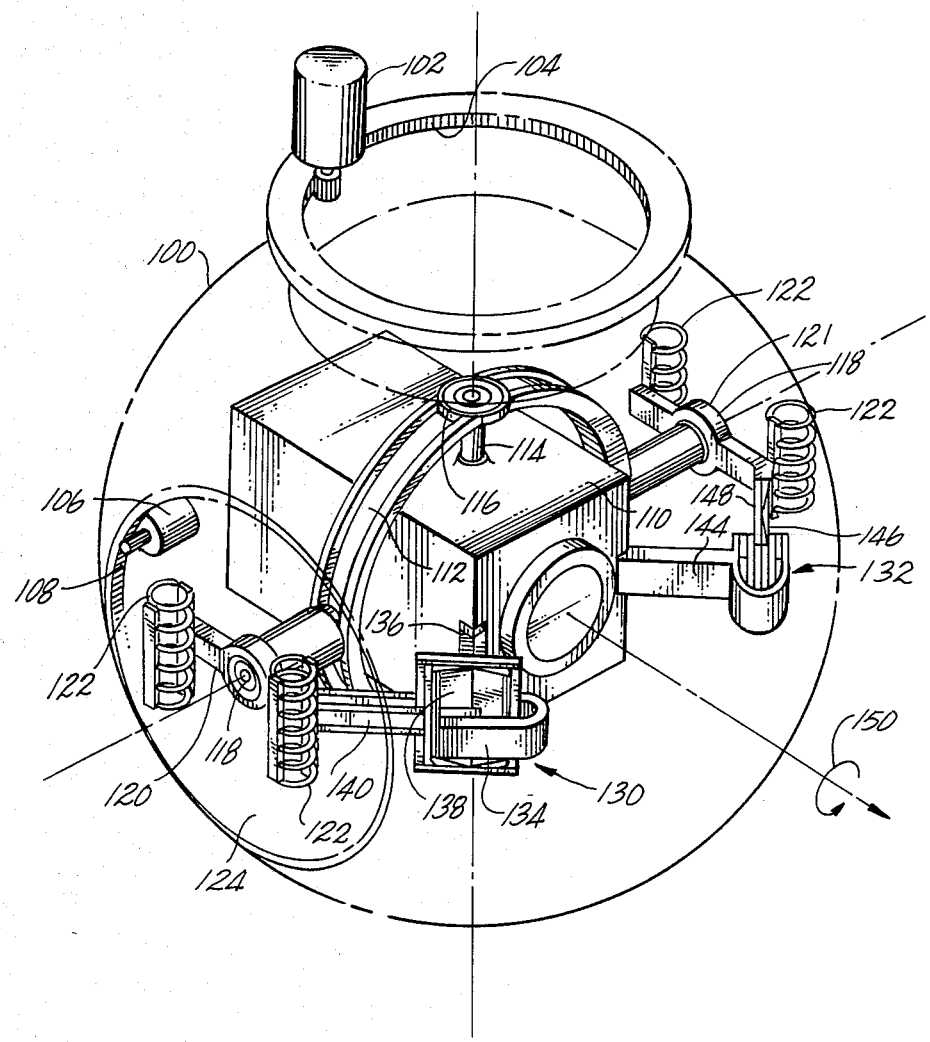

STABILIZATION SYSTEM FOR SOFT-MOUNTED PLATFORM

FIELD OF THE INVENTION

This invention relates to stable platform systems and, more particularly, to a system for isolating a payload from angular and translational motion caused by vibration of the platform supporting structure.

BACKGROUND OF THE INVENTION

Various systems have heretofore been proposed to isolate a mechanical payload, such as a platform for a sighting device, a camera, a gun, or the like from both low frequency movement or higher frequency vibrations of the supporting structure for the platform, for example, as where the platform is mounted on a moving vehicle, such as a dolly, an automobile, an airplane, or the like. Such stabilization systems must operate over a wide frequency range. One such platform stabilization system is described, for example, in U.S. Pat. No. 4,033,541 issued July 5, 1977, to the same inventor as the present application. In the stabilization system shown in the patent, a compliant isolator and a spherical bearing assembly are connected in series between the platform payload and the vehicle. Corrective torques are applied to the payload by linear actuators connected between the supporting structure of the vehicle and the payload. This system described in the patent works well over a broad range of frequencies and combinations of angular and translational vibratory inputs. However, the actuators may be required to accommodate relatively large translational displacements between the supporting base and the platform payload due to the translational displacements occurring primarily in the isolator. The isolator usually comprises springs or other compliant means which may have to be relatively "soft" to be effective at very low frequencies. For example, if the stable platform were used to mount a gun or artillery piece having a large recoil, relatively large displacements of the isolator might be encountered. The arrangement shown in the patent therefore might require actuators which have a substantial length of stroke. A disadvantage of the system shown in the patent, therefore, is the degree of motion required in the actuator to allow for translational as well as rotational displacement of the payload relative to the supporting base. The result is the magnetic actuators must be made with greater stroke length in the solenoid actuators or greater air gaps if linear motors are used as the actuators. The greater the air gaps or the longer the stroke of the solenoid, the greater the power and weight in the actuator needed to develop a given amount of torque.

SUMMARY OF THE INVENTION

The present invention is directed to an improved stabilizing system of the type described in the aboveidentified patent which permits much lighter and lower power actuators to be used to dynamically stabilize the payload. The present invention enables the use of magnetic actuators in which the moving parts are separated by very small air gaps and which produce high torque with much less power and weight than has heretofore been required. The payload is torqued directly across the multi-axis angular support, so that the angular motion support structure can be made lightweight, thereby reducing the inertia on the torquing system and further reducing the power required to stabilize and slew the payload. The design of the present invention allows the torque to be applied at a large radius, further enhancing the torque per watt capability of the actuator.

These and other advantages of the present invention are achieved by providing apparatus for inertially stabilizing the motion of a payload mounted on a supporting system in which spring isolation means and universal pivot means are joined in series through an intermediate connecting member between the supporting system and the payload. The spring isolation means permits translational movement or decoupling while the universal pivot means permits angular movement of the payload relative to the supporting member. Actuator means is connected between the payload and the intermediate connecting member for rotating and torquing the payload relative to the intermediate connecting member about at least two axes of rotation of the universal pivot means. Means including a sensor and a servo drive control the actuators to torque the payload relative to the intermediate connecting member. The isolator means is outside the servo loop, and translational motion of the payload has no effect on the actuators. This arrangement permits magnetic actuators to be used having a very small air gap between the relative moving parts, providing only angular freedom between payload and support system.

DESCRIPTION OF THE DRAWINGS

For a more complete understanding of the invention, reference should be made to the accompanying drawings, wherein:

FIG. 1 is a block diagram of a stabilized platform system incorporating the features of the present invention;

FIG. 2 is a simplified top view of a preferred embodiment of the present invention;

FIG. 3 is a simplified top view of an alternative embodiment of the present invention;

FIG. 4 is a perspective view of a magnetic two-axis actuator; and

FIG. 5 is a perspective view of an alternative embodiment of the present invention.

DETAILED DESCRIPTION

Referring to FIG. 1 in detail, the numeral 10 indicates generally a support base which may, for example, be a vehicle or aircraft frame. A platform payload 12 is supported for movement in azimuth and elevation from the support base 10 by a coarse azimuth drive 14 and a coarse elevation drive 16, an isolation system 22, an elevation gimbal 20, and an azimuth gimbal 18. If, for example, a tracking device is supported on the platform payload, signals generated by the tracking device may be used through a suitable servo control to operate the actuators 23 and 24, and moves the payload line of sight relative to the isolator springs 22, thus tracking a given target. The coarse elevation drive 16 and coarse azimuth drive 14 could be driven by servo controllers 32 to null relative angle transducers 34 and 36 respectively in elevation and azimuth such that the coarse drives follow the payload tracking angles. This then represents a coarse/fine tracking system with the inner gimbals 20 and 18 providing a low friction or fine tracking system and a coarse followup system providing for larger angular displacements. The coarse elevation and the coarse azimuth drives may be part of a conventional gimbal support system, such as is wellknown in the art and forms no part of the present invention.

Since the coarse drive systems have relatively high inertia and do not respond to high frequency vibrations, the payload 12 is attached to the coarse drive system by a high performance stabilization system which stabilizes the payload against vibrations of the support base transmitted through the coarse drive system. The stabilization system provides stabilization about at least two rotational axes, such as rotation in azimuth and rotation in elevation. Rotation about these two axes may be provided by a conventional gimbal or flexure support, as indicated at 18 and 20, or by a universal ball pivot. The gimbal system of the stabilizer is connected to the coarse drive system through isolator springs 22 which permit relative translational movement between the rigid coarse drive system and the platform payload 12.

If there are only two axes of freedom in the inner gimbal set, as indicated by 18 and 20, then the spring isolation system 22 would act as a spring restraint in the third axis, which in FIG. 1 is the roll axis about the line of sight. If a universal ball pivot is used which does decouple in the third axis, additional roll control means could be provided as illustrated in FIG. 2.

In accordance with the teaching of the present invention and in contrast to the prior art, stabilization of the payload is provided by a plurality of actuators, such as indicated at 23 and 24, which are rigidly connected between the payload 12 and an intermediate frame member 26 connecting the stabilizer gimbal system to the isolator springs 22. The actuators 23 and 24, in a manner hereinafter described in detail, provide a torque about the respective axes of rotation of the azimuth gimbal 18 and the elevation gimbal 20. The actuators are controlled by a suitable servo controller 28 in response to control signals produced by an inertial sensor 30 or some other non-inertially referenced sensor. The inertial sensor may be a gyro system which provides a stable reference for the payload and provides correction signals to the servo controller for driving the actuators to stabilize the payload about the two axes of rotation of the gimbal system.

The arrangement of FIG. 1 is different from the prior art, such as described in U.S. Pat. No. 4,033,541, in that the actuators 23 and 24 are connected only in parallel with the gimbal system rather than being connected across the gimbal system and isolator springs. The deflection of the isolator springs 22, in providing translational motion decoupling of the payload relative to the coarse drive systems, has no direct effect on the actuators 23 and 24. Thus the air gaps between the armatures and the field structure of the magnetic actuators 23 and 24 can be made quite small since the actuators do not need to accommodate relative translational motion of the isolator.

A top view of a preferred embodiment of the present invention is shown in FIG. 2. The platform payload, by way of example, may be in the form of two sections 34 and 36 which may, for example, be a pair of cameras, sighting instruments, laser beam generators, or the like. The two sections are joined by three or more rods 38, 40, and 42 which form a rigid payload assembly. The rod 40 is connected at its center to a ball joint type angular pivot 43 including a ball member 44 secured to the rod 40 and a socket member 46 anchored to an intermediate frame member 48. The ball and socket angular pivot allows three-dimensional angular motion of the payload sections 34 and 36 relative to the intermediate frame 48. The intermediate frame 48 is supported at its outer ends by isolation springs 50 which are mounted to a support base 52. The support base 52 may be part of a vehicle or other mechanism which is subject to vibrations which could be detrimental to the operation of the payload device. While the springs 50 are shown as extending horizontally in the top view of FIG. 2, it will be understood that the springs could be mounted vertically so as to be placed in compression by the weight of the stabilized assembly, and isolate motion in all three directions.

According to the present invention, a torque is applied to the load 34, 36 relative to the intermediate frame 48 about three mutually perpendicular axes of rotation provided by the angular pivot formed by the ball 44 and socket 46. To this end, two magnetic linear actuators, indicated respectively at 54 and 56, are provided. Each actuator is capable of producing linear motion along two mutually perpendicular axes. Such an actuator is shown, for example, in FIG. 4. The actuator comprises a U-shaped stator member 58 having a pair of pole pieces 60 and 62 made of permanent magnet material, such as samarium cobalt. The magnetic pole pieces, in combination with the U-shaped stator 58 made of iron or other suitable magnetic material, produce a magnetic field across the gap having a very high flux density. An armature assembly 64 is movably positioned in the gap between the pole pieces 60 and 62. The armature assembly is formed with two sets of coils, an upper set 66, as viewed in FIG. 4, and a lower set 68. The two sets of coils provide current conductive paths which are at right angles to each other and which are perpendicular to the direction of flux between the pole pieces. Depending on the polarity of the current, a current passed through the coil set 66 will produce motion of the armature assembly in a direction parallel to the pole faces and perpendicular to the direction of the coil conductors through the gap. Similarly, the lower set of windings 68 will produce a motion at right angles to the direction of motion produced by the upper set of coils. Thus the actuator forms a linear motor which selectively produces motion along either of two mutually perpendicular axes.

The permanent magnet stators of the two actuators are rigidly mounted on the payload sections 34 and 36 by support brackets 70 and 72, respectively. The armature assemblies of the two actuators in turn are rigidly supported on the intermediate frame 48 by support brackets 74 and 76. The actuator armatures 54 and 56 are oriented such that the torques about the three payload axes are perpendicular to each other. One set of coils of each of the actuators produces a vertical movement of the respective armatures while the other set of coils produces a horizontal motion. The horizontal motion produces a torque about the vertical axis of rotation of the pivot. Vertical forces in the same direction in both actuators produce pitching motion about a horizontal axis through the pivot while vertical forces in opposite directions produced by the two horizontal windings result in a roll motion about a horizontal axis through the pivot extending parallel to the line of sight. Thus three servo controllers may control three axes with the two-axis actuators.

Stabilization of the load is controlled by inertial sensors 80 mounted on the stabilized payload which produce output signals indicating displacement of the load about the three axes. A servo control 82, in response to the displacement signals from the inertial sensors, provides a signal to the armature coils of the actuators 54 and 56 to provide a corrective torque about each of the three axes of the pivot.

Referring to FIG. 3, there is shown a two-axis embodiment using a single two-axis actuator. In this embodiment, the intermediate frame 48 is attached to the payload through a two-axis internal gimbal system, indicated generally at 82, which allows rotation between the load and the intermediate frame about a vertical axis 84 and about a horizontal axis 86. A two-axis actuator 88 has the permanent magnet field structure rigidly supported on the frame member 42 while the armature 92 is rigidly attached to the intermediate frame 48 through a bracket 94. The actuator produces a horizontal force which rotates and torques the payload about the vertical axis 84 and produces a vertical force which torques the payload about the horizontal axis 86. Inertial sensors 80 and servo controller 82 provide signals to the actuator 88 to produce corrective torques about the two axes.

Referring to FIG. 5, there is shown a perspective view of a stabilization system for a payload mounted in a turret, such as might be used for a payload which must be maneuvered and aimed, such as the system described above in connection with FIG. 1. The turret includes an outer shell 100 which is rotated about a vertical axis by a coarse azimuth drive motor 102 engaging a ring gear 104. Coarse elevation drive is provided by a motor 106 which engages a ring gear 108. A payload 110 is positioned inside the turret and is supported by an inner gimbal system which includes a pitch gimbal ring 112 to which the payload 110 is pivotally attached by a shaft 114 and bearings 116 for rotation about a vertical axis. A gimbal ring 112 is in turn journaled for rotation about a horizontal axis by bearings 118 mounted in intermediate frame members 120. The intermediate frame members are secured at opposite ends to isolator members 122. The isolator members are in turn attached to end plates 124 which are journaled in the turret frame 100 and are rotated by the coarse elevation drive motor 106.

The load 110 is stabilized by a pair of two-axis magnetic actuators, indicated generally at 130 and 132. The actuator 130 includes a U-shaped permanent magnet stator 134 which is secured to the payload 110 by a rigid supporting bracket 136. The moving coil armature assembly 138 is supported in the air gap of the magnetic stator 134 by a rigid supporting arm 140 that is integral with the intermediate frame member 120. Similarly, the actuator 132 has a U-shaped stator 142 which is rigidly attached to the load 110 by a bracket 144. The actuator 132 includes a moving coil armature 146 which is rigidly attached to the intermediate frame member 121 by a support arm 148. As in the arrangement of FIG. 2, the actuators are positioned so that the armature torques produced by linear forces at a radius from the rotational center are mutually perpendicular to each other. Thus the actuators are able to produce torques around the two mutually perpendicular axes of the inner gimbal system to stabilize the payload against rotation due to vibration of the turret or supporting moving vehicle. Again, it is evident from FIG. 5 that transverse movements of the load do not affect the positioning of the armatures within the air gap of the magnetic field structure of the actuators. Thus the air gaps can be made quite small, permitting a much higher level of flux density in the gap and resulting in less current to produce a given amount of torque on the load.

In this embodiment, roll motion about the line of sight 150 is not actively controlled but is passively restrained by the isolation system 122 and hence follows the vehicle or base structure for the low frequency angular motion spectrum but is vibrationally decoupled for higher frequencies.

What is claimed is:

1. Apparatus for stabilizing the motion of an inertial load relative to a supporting member, comprising:
an intermediate frame member, compliant isolation means connecting the intermediate frame member to the supporting member for providing limited translational motion of the intermediate member relative to the supporting member, pivot means connecting the load to the intermediate frame member, the pivot means allowing rotation of the load relative to the intermediate frame member about at least two mutual perpendicular axes of revolution, actuator means connected to the load and to the intermediate frame member for rotating the load relative to the intermediate frame member about each of said axes of revolution, and means for controlling said actuator means to adjust the angular position of the load relative to the intermediate frame about both said two axes of revolution.

2. Apparatus of claim 1 wherein said actuator means includes a two-axis linear actuator.

3. Apparatus of claim 2 wherein the linear actuator has a stator member forming a magnetic field extending across an air gap, and has an armature member movable linearly through the air gap in any direction substantially perpendicular to the direction of the magnetic field.

4. Apparatus of claim 3 wherein the stator and armature are rigidly anchored respectively to the load and the intermediate frame member.

5. Apparatus of claim 3 wherein the stator and armature are rigidly anchored respectively to the intermediate frame member and the load.

6. Apparatus of claim 1 wherein said actuator means includes first and second two-axis linear actuators.

7. Apparatus of claim 6 wherein the first and second two-axis linear actuators each have a stator member and an armature member movable linearly relative to the stator member in any direction extending substantially perpendicular to the direction of the magnetic field.

8. Apparatus for stabilizing a load against rotational motion about two or more mutually perpendicular axes and to isolate the load from translational vibrational motion relative to a support, said apparatus comprising:
pivot means having two relatively moving sections, the first section pivoting relative to the second section about at least two mutually perpendicular axes passing through the pivot point of said pivot means, compliant isolation means connecting the first section of the pivot means to the support, the isolation means providing limited translational movement of the pivot means relative to the support, the second section of the pivot means being rigidly connected to the load, actuator means having a drive member rigidly connected to one of the two sections of the pivot means and a drive member rigidly connected to the other of the two sections for rotating the two sections of the pivot means relative to each other about each of said mutually perpendicular axis, inertial sensor means connected to the load, and servo means responsive to the sensor means for driving the actuator means to adjust the relative angular position of the two sections about both of said axes and to correct for rotational movement of the first section of the pivot means by the support.

9. Apparatus of claim 8 wherein the pivot means comprises a gimbal system supporting the load from the isolator.

10. Apparatus of claim 8 wherein the pivot means provides relative rotation of the two sections about three mutually perpendicular axes.

11. Apparatus of claim 8 wherein the actuator means comprises a two-axis magnetic linear actuator.

12. Apparatus of claim 11 wherein the linear actuator means includes a magnetic field means for producing a magnetic field across a narrow gap, and moving coil means positioned in the gap, the field means being rigidly connected to one of said moving sections and the moving coil means being rigidly connected to the other of said moving sections.

13. Apparatus of claim 12 wherein the moving coil means includes two sets of coils arranged with the coils conducting current through the gap along mutually perpendicular paths.

* * * * *